United States Patent [19]

Takahashi et al.

[11] Patent Number: 4,944,121
[45] Date of Patent: Jul. 31, 1990

[54] COOLANT SUPPLY NOZZLE APPARATUS FOR SLICING MACHINE

[75] Inventors: Hiroyuki Takahashi; Yoshitaka Shiratori, both of Tokyo, Japan

[73] Assignee: Mitsubishi Kinzoku Kabushiki Kaisha, Tokyo, Japan

[21] Appl. No.: 255,826

[22] Filed: Oct. 11, 1988

[30] Foreign Application Priority Data

Oct. 16, 1987 [JP] Japan .................. 62-158601[U]

[51] Int. Cl.$^5$ .................. B24B 55/02; B26D 7/10; B05B 15/08
[52] U.S. Cl. .................. 51/267; 239/587; 83/171
[58] Field of Search .............. 51/267, 95 WH, 95 LH; 239/227, 587; 222/519, 520; 83/168, 170, 171

[56] References Cited

U.S. PATENT DOCUMENTS

| | | | |
|---|---|---|---|
| 1,862,583 | 6/1932 | Skriba | 51/267 |
| 2,035,163 | 3/1936 | Holmberg | 51/95 LH |
| 3,543,451 | 12/1970 | Smith | 51/267 |

Primary Examiner—Frederick R. Schmidt
Assistant Examiner—Bruce P. Watson
Attorney, Agent, or Firm—Scully, Scott, Murphy & Presser

[57] ABSTRACT

A coolant supply nozzle apparatus for a slicing machine includes a body, a first mobile member, a second mobile member, a nozzle tube, a first positioner and a second positioner. The body has a pivot shaft disposed so as to extend axially of the blade. The first mobile member is pivotally mounted on the shaft. The second mobile member is mounted on the first mobile member so as to be movable in a direction parallel to the shaft. The nozzle tube is mounted on the second mobile member and has an opening end adapted to be directed toward the cutting edge of the shaft. The opening end is shifted from the pivot shaft radially of the blade. The first positioner serves to position the first mobile member in place while the second positioner serves to position the second mobile member in place.

9 Claims, 1 Drawing Sheet

COOLANT SUPPLY NOZZLE APPARATUS FOR SLICING MACHINE

BACKGROUND OF THE INVENTION

1. Field of the Invention

The present invention relates to a nozzle apparatus for directing a coolant to an inside diameter rotary blade of a slicing machine which cuts a semiconductor crystalline rod material into slices.

2. Prior Art

A known slicing machine of the aforedescribed type includes an inside diameter rotary blade comprised of an annular thin plate and abrasive grains such as diamond grains deposited on an inner periphery of the plate for serving as an inner peripheral cutting edge. A coolant supply nozzle is located at the central opening of the blade for directing a coolant to the inner peripheral cutting edge during the slicing operation.

In the slicing machine as described above, the position of the coolant nozzle has to be manually regulated during the rotation of the blade. The nozzle has to be moved in each direction of the X-Y-Z axes to be positioned in an optimal location. Such positioning is dangerous since it has to be carried out during the rotation of the blade. In addition, although the positioning in a direction perpendicular to the blade, e.g., in the direction of an X-axis, can be conducted relatively easily, the positioning in a plane parallel to the blade, e.g., in a Y-Z plane, is very difficult, resulting in a lower operation efficiency. This is because the movement of the nozzle in one direction influences the positioning in the other direction since the inner peripheral cutting edge is arcuately shaped.

SUMMARY OF THE INVENTION

It is therefore an object of the present invention to provide a coolant supply nozzle apparatus in which the positioning of the nozzle can be very easily conducted.

According to the present invention, there is provided a coolant supply nozzle apparatus for directing a coolant to an inner peripheral cutting edge of an annular disk blade rotating about an axis thereof, comprising:
- a body including a pivot shaft disposed so as to extend axially of the blade;
- a first mobile member pivotally mounted on the shaft;
- a second mobile member mounted on the first mobile member so as to be movable in a direction parallel to the shaft;
- a nozzle tube mounted on the second mobile member and having an opening end adapted to be directed toward the cutting edge of the blade, the opening end being shifted from the pivot shaft radially thereof;
- first positioning means for positioning the first mobile member in place; and
- second positioning means for positioning the second mobile member in place.

DESCRIPTION OF THE PREFERRED EMBODIMENT OF THE INVENTION

Figure 1:
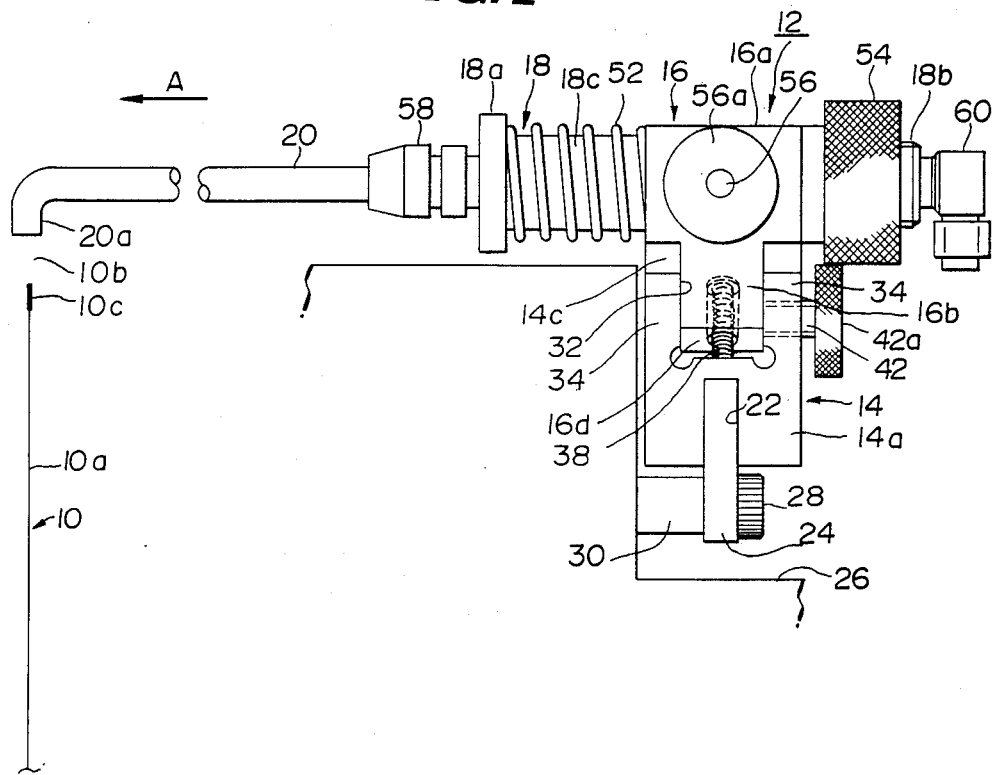
FIG. 1 is a side elevation of a coolant supply nozzle apparatus provided according to the present invention.
Figure 2:
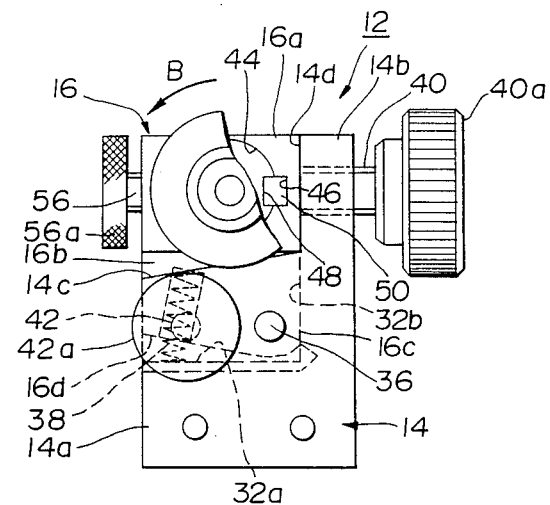
FIG. 2 is a partially cutaway rear view of the apparatus of FIG. 1.

Referring to FIGS. 1 and 2, there are illustrated an inside diameter rotary saw or blade 10 of a known slicing machine and a coolant supply nozzle apparatus 12 for directing a coolant to the inside diameter blade 10 in accordance with the present invention. The inside diameter blade 10 has an annular plate 10a having a central opening 10b and abrasive grains deposited on an inner periphery thereof for serving as an inner peripheral cutting edge 10c. The coolant supply nozzle apparatus 12 is disposed adjacent to the blade 10, and comprises a generally L-shaped stationary body 14, a first mobile member or block 16, a second mobile member 18 of a cylindrical shape and a nozzle tube 20.

The body 14 is comprised of a rectangular parallelepipedonal block portion 14a and a standard portion 14b extending upwardly from one side of the block portion 14a, and is provided with a mounting groove 22 formed in its lower face. A mounting plate 24 is fitted in the groove 22 and is secured thereto through mounting screws (not shown). The body 14 is fixedly mounted on a base 26 with the mounting plate 24 fixedly secured thereto through fastening bolts 28 and spacers 30.

The block portion 14a of the body 14 has an upper surface 14c inclined downwardly in a direction away from the standard portion 14b, and a recess 32 is formed in the upper surface 14c so as to define front and rear wall portions 34 and 34. A pivot shaft 36 is mounted on the block portion 14a with its opposite ends supported by the front and rear wall portions, respectively, in such a manner that it is disposed perpendicular to the blade 10, i.e., parallel to an axis of rotation of the blade 10. The recess 32 has a horizontally disposed bottom face 32a and a vertically disposed side wall face 32b which is flush with a wall face 14d of the standard portion 14b, and the pivot shaft 36 is located adjacent to the corner portion where the bottom face 32a and the wall face 32b merge into.

The first mobile member 16 is comprised of a generally cubical block portion 16a and a plate-like portion 16b formed at the lower face of the cubical block portion 16a, and is disposed on the block portion 14a of the body 14 with its plate-like portion 16b pivotally mounted on the pivot shaft 36. The first mobile member 16 has a side wall face 16c facing both the standard portion 14b of the body 14 and the wall face 32b of the recess 32, and a lower face 16d facing the bottom face 32a of the recess 32. As best shown in FIG. 2, the lower face 16d is inclined upwardly in a direction away from the standard portion 14b so that it intersects the side wall face 16c at an acute angle, and the corner portion where the lower face 16d and the side wall face 16c merge into is rounded off. With this construction, the first mobile block 16 can be turned or pivoted about the pivot shaft 36 within a prescribed range of angle.

Further, urging means in the form of a compression coil spring 38 is accommodated in the recess 32 with its upper portion inserted in a hole formed in the lower face 16d of the first mobile member 16 and acts between the bottom face 32a of the recess 32 and the first mobile member 16 to urge the first mobile member 16 toward the standard portion 14b of the body 14. The standard portion 14b of the body 14 is provided with a transversely extending threaded bore formed therethrough, and an adjusting screw 40 with a knob 40a at its one end is screwed into the bore so that the other end of the screw 40 can protrude from the wall face 14d of the standard portion 14b to be brought into abutment with the wall face 16c of the first mobile member 16. A first stopper screw 42, which has a knob 42a mounted on its one end, is further inserted through the rear wall portion 34 of the standard portion 14b into the recess 32 so that its other end can be brought into abutment with the first mobile member 16 to thereby retain it in place. Thus, the spring 38, the adjusting screw 40 and the stopper screw 42 serve as first positioning means for positioning the first mobile member 16 in place.

The first mobile member 16 is further provided with a bore 44 of a circular cross-section formed therethrough and extending parallel to the pivot shaft 36, and the second mobile member 18 is inserted through the bore 44 for sliding movement therethrough. An elongated key groove 46 is formed in the inner peripheral surface of the bore 44 while an elongated key groove 48 complementary to the groove 46 is formed in the outer peripheral surface of the second mobile member 18 so as to cooperate with the groove 46 to define a key bore, and a spline key 50 is accommodated therein for preventing the rotation of the second mobile member 18 while allowing its axial movement. The second mobile member 18 has a flange portion 18a formed at its foward end and an externally threaded portion 18b formed at its rearward end. A forward end portion 18c of the second mobile member 18 is protruded from the first mobile member 16, and urging means in the form of a compression coil spring 52 is mounted therearound with its one end held in contact with the flange portion 18b and with its other end held in contact with the first mobile member 16 and acts between the flange portion 18a and the first mobile member 16 to urge the second mobile member 18 forwardly relative to the first mobile member 16. An internally threaded knob 54 is threadedly engaged with the externally threaded portion 18b of the second mobile member 18 and is held in contact with the rearward end face of the first mobile member 16. A second stopper screw 56, which has a knob 56a mounted on its one end, is further inserted through the block portion 16a into the bore 44 so that its other end can be brought into abutment with the second mobile member 18 to thereby retain it in place. Thus, the spring 52, the screw assembly 18b and 54 and the stopper screw 56 serve as second positioning means for positioning the second mobile member 18 in place.

The second mobile member 18 has an axially extending through bore for flowing the coolant therethrough, and the nozzle tube 20 is connected to its forward end through a front fitting 58 while a tube (not shown) connected to a source of the coolant is connected to its rearward end through a rear fitting 60. The nozzle tube 20 extends coaxially with the second mobile member 18 so that its opening end 20a is disposed within the central opening 10b of the blade 10. As best shown in FIG. 1, the opening end 20a is formed to be bent perpendicular to the remaining portion so that the opening end can face the inner peripheral cutting edge 10c of the blade 10. Thus, the opening end 20a is shifted from the pivot shaft 36 by a predetermined distance radially of the shaft.

In the coolant supply nozzle apparatus as described above, the opening end 20a of the nozzle tube 20 can be very easily positioned at its optimal location. For adjusting its axial position, i.e., the position in the direction of X axis, the knob 54 is first turned in a prescribed direction. If the knob 54 is turned for example in a counterclockwise direction, the second mobile member 18 is caused to move forwardly as designated at A in FIG. 1 under the influence of the compression coil spring 52. On the other hand, if the knob 54 is turned in a clockwise direction, the second mobile member 18 is caused to move rearwardly against the biasing force of the spring 52. Thus, the axial position of the opening end 20a of the nozzle tube 20 is adjusted, and if the opening end 20a is brought into an optimal position, the stopper screw 56 is then screwed into the first mobile member 16 so that the end of the screw is brought into firm abutment with the second mobile member 18. Thus, the axial position of the opening end 20a of the nozzle tube 20 is fixed and retained there.

For adjusting the positions in a plane parallel to the blade 10, i.e., the positions in the directions of Y-Z axes, the first mobile member 16 is first pivoted in a prescribed direction by turning the knob 40a. When the knob 40a is turned in such a direction that the screw 40 is further screwed into, the first mobile member 16 is caused to pivot about the pivot shaft 36 in a direction designated at B in FIG. 2 against the urging force of the spring 38. On the other hand, when the knob 40a is turned in such a direction that the protruding end of the screw 40 is retracted, the first mobile member 16 is caused to pivot about the pivot shaft 36 clockwise in FIG. 2 under the influence of the urging spring 38. Thus, the opening end 20a of the nozzle tube 20 can be turned in a plane parallel or identical to the blade 10 in such a manner that it generates an arcuate contour with a diameter smaller than that of the inner peripheral cutting edge 10c of the blade 10. If the opening end 20a is brought into a position optimal for directing the coolant to the inner peripheral cutting edge 10c, the knob 42a is then turned so that the screw 42 fixes the first mobile member 16.

As described above, in the coolant supply nozzle apparatus in accordance with the present invention, the opening end 20a of the nozzle tube 20 can be moved in an arcuate fashion, so that the positioning in the plane parallel to the blade 10 can be very easily conducted. In addition, the apparatus has the advantage that it is simple in structure and small in size since the positioning of the Y-Z directions can be carried out by only one mechanism.

Obviously many modifications and variations of the present invention are possible in the light of the above teachings. It is therefore to be understood that within the scope of the appended claims, the invention may be practiced otherwise than as specifically described.

What is claimed is:

1. A coolant supply nozzle apparatus for directing a coolant to an inner peripheral cutting edge of an annular disk blade rotating about an axis thereof, comprising:

a body including a pivot shaft disposed so as to extend axially of said blade;

a first mobile member pivotally mounted on said shaft;

a second mobile member mounted on said first mobile member so as to be movable in a direction parallel to said shaft;

a nozzle tube mounted on said second mobile member and having an opening end adapted to be directed toward the cutting edge of said blade, said opening end being shifted from said pivot shaft radially of said shaft;

first positioning means for positioning said second mobile member in place, and comprising (i) pivoting means for causing said first mobile member to pivot about said pivot shaft, and
(ii) stopper means for stopping said first mobile member in place; and
second positioning means for positioning said second mobile member in place;
said first mobile member being supported by the pivot shaft for pivotal movement to move the nozzle in a plane perpendicular to the axis of the blade while maintaining the position of the nozzle in an axial direction of the blade;
said second mobile member being supported by the first mobile member for movement in a direction parallel to said shaft to move the nozzle axially of the blade while maintaining the position of the nozzle in a plane perpendicular to the axis of said blade;
wherein said pivoting means of said first positioning means comprises
(i) urging means interposed between said body and said first mobile member for urging said first mobile member to pivot about said pivot shaft in a prescribed direction, and
(ii) an adjusting screw threadedly mounted on said body for causing said first mobile member to pivot about said pivot shaft in a direction opposite to said prescribed direction against the urging force of said urging means.

2. A coolant supply nozzle apparatus according to claim 1, in which said second positioning means comprises moving means for moving said second mobile member toward and away from said blade and stopper means for stopping said second mobile member in place.

3. A coolant supply nozzle apparatus according to claim 2, in which said moving means of said second positioning means comprises urging means disposed between said first and second mobile members for urging said second mobile member in a prescribed direction parallel to said shaft and a screw assembly mounted on said second mobile member for moving said second mobile member in a direction opposite to said prescribed direction against the urging force of said urging means.

4. A coolant supply nozzle apparatus according to claim 3, wherein:
the first mobile member forms a bore extending through the first mobile member, parallel to the pivot shaft;
the second mobile member is inserted through, and is supported by, the first mobile member for sliding movement through said bore, and the second mobile member includes
(i) forward and rearward ends,
(ii) a flange portion formed at said forward end, and
(iii) an externally threaded portion formed at said rearward end;
the urging means includes a spring mounted on the second mobile member, having a first end held in contact with said flange portion, and a second end held in contact with the first mobile member, and urging the second mobile member forwardly relative to said first mobile member; and
the screw assembly comprises an internally threaded member threadedly engaging said externally threaded portion and held in contact with the first mobile member.

5. A coolant supply nozzle apparatus according to claim 4, wherein:
the second mobile member forms an axially extending through bore for conducting the coolant therethrough; and
the nozzle tube is connected to the second mobile member in fluid communication with said through bore thereof to receive the coolant from the second mobile member.

6. A coolant supply nozzle apparatus according to claim 1, wherein:
said body includes
(i) a block portion having a first face, and
(ii) a standard portion having a second face extending from and generally perpendicular to said first face;
the first mobile member includes
(i) a first wall facing said first face, and
(ii) a second wall facing said second face, and intersecting said first wall at an acute angle;
the urging means includes a spring extending between said first face and said first wall; and
the adjusting screw is threaded through and is movably supported by said standard portion, and includes an end protruding from said second face and into abutment with said second wall.

7. A coolant supply nozzle appararatus for directing a coolant to an inner peripheral cutting edge of an annular disk blade rotating about an axis thereof, comprising:
a body including a pivot shaft defining a pivot axis positioned to extend parallel to the axis of said blade;
a first mobile member pivotally mounted on said shaft;
a second mobile member mounted on said first mobile member and supported by said first mobile member for sliding movement on a selected axis parallel to said pivot axis;
a nozzle tube mounted on said second mobile member and having an opening end adapted to be directed toward the cutting edge of said blade, said opening end being shifted from said pivot shaft radially of said shaft;
first positioning means for positioning said first mobile member in place; and
second positioning means for positioning said second mobile member in place, and including urging means engaging the first and second mobile members and applying a force to the second mobile member urging said second mobile member along said selected axis.

8. A coolant supply nozzle according to claim 7, wherein the nozzle tube includes:
a longitudinally extending body portion connected to the second mobile member for movement therewith, and defining a nozzle axis coaxial with said selected axis; and
an outlet portion connected to the body portion and extending generally perpendicular therefrom, said outlet portion including the opening end of the nozzle tube.

9. A coolant supply nozzle according to claim 8, wherein the second positioning means further includes means in contact with the first mobile member and engaging the second mobile member to move the second mobile member against the force applied thereto by the urging means.

* * * * *